US011861193B2

(12) United States Patent
Jacob et al.

(10) Patent No.: US 11,861,193 B2
(45) Date of Patent: *Jan. 2, 2024

(54) EMULATING MEMORY SUB-SYSTEMS THAT HAVE DIFFERENT PERFORMANCE CHARACTERISTICS

(71) Applicant: Micron Technology, Inc., Boise, ID (US)

(72) Inventors: Jacob Mulamootil Jacob, Cedar Park, TX (US); John M. Groves, Austin, TX (US); Steven Moyer, Round Rock, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/097,168

(22) Filed: Jan. 13, 2023

(65) Prior Publication Data

US 2023/0168824 A1    Jun. 1, 2023

Related U.S. Application Data

(63) Continuation of application No. 17/464,912, filed on Sep. 2, 2021, now Pat. No. 11,556,259.

(51) Int. Cl.
*G06F 3/06* (2006.01)

(52) U.S. Cl.
CPC .......... *G06F 3/0635* (2013.01); *G06F 3/0605* (2013.01); *G06F 3/067* (2013.01); *G06F 3/0613* (2013.01); *G06F 3/0631* (2013.01); *G06F 3/0659* (2013.01)

(58) Field of Classification Search
None
See application file for complete search history.

(56) References Cited

U.S. PATENT DOCUMENTS

| 8,799,557 | B1 | 8/2014 | Chen | |
|---|---|---|---|---|
| 2003/0154349 | A1* | 8/2003 | Berg | .................. G06F 9/30181 |
| | | | | 712/E9.047 |
| 2010/0125444 | A1 | 5/2010 | Arya | |
| 2019/0318797 | A1* | 10/2019 | Cha | ........................ G11C 29/38 |

FOREIGN PATENT DOCUMENTS

WO    2013101050 A1    7/2013

* cited by examiner

*Primary Examiner* — Brian R Peugh
(74) *Attorney, Agent, or Firm* — Lowenstein Sandler LLP

(57) ABSTRACT

A system and method for updating a configuration of a host system so that the memory sub-system of the host system emulates performance characteristics of a target memory sub-system. An example system includes a memory sub-system; and a processor, operatively coupled with the memory sub-system, to perform operations comprising receiving a request to emulate a characteristic of a target memory sub-system, identifying a candidate configuration that generates a load on a memory sub-system of a host system to decrease a characteristics of the memory sub-system of the host system, and updating a configuration of the host system based at least on the candidate configuration, wherein the updated configuration changes the memory sub-system of the host system to emulate the characteristic of the target memory sub-system.

20 Claims, 6 Drawing Sheets

500

---

Determining, by a processing device, a configuration of a host system, the host system comprising a memory sub-system
510

---

Receiving, by the processing device, a request to emulate a characteristic of a target memory sub-system
520

---

Analyzing a plurality of candidate configurations for the host system, wherein the plurality of candidate configurations comprises a candidate configuration that generates a load on the memory sub-system to decrease characteristics of the memory sub-system
530

---

Updating the configuration of the host system based on the plurality of candidate configurations, wherein the updated configuration changes the memory sub-system to emulate the characteristic of the target memory sub-system
540

FIG. 5

EMULATING MEMORY SUB-SYSTEMS THAT HAVE DIFFERENT PERFORMANCE CHARACTERISTICS

RELATED APPLICATIONS

This application is a continuation application of co-pending U.S. patent application Ser. No. 17/464,912, filed Sep. 2, 2021, which is incorporated herein by reference.

TECHNICAL FIELD

Embodiments of the disclosure relate generally to memory sub-systems, and more specifically, relate to a framework for emulating memory devices that have different performance characteristics.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 5 is a flow chart of a method for updating the configuration of the host system to emulate the performance characteristics of a target memory sub-system, in accordance with some embodiments of the present disclosure.

DETAILED DESCRIPTION

Figure 1:
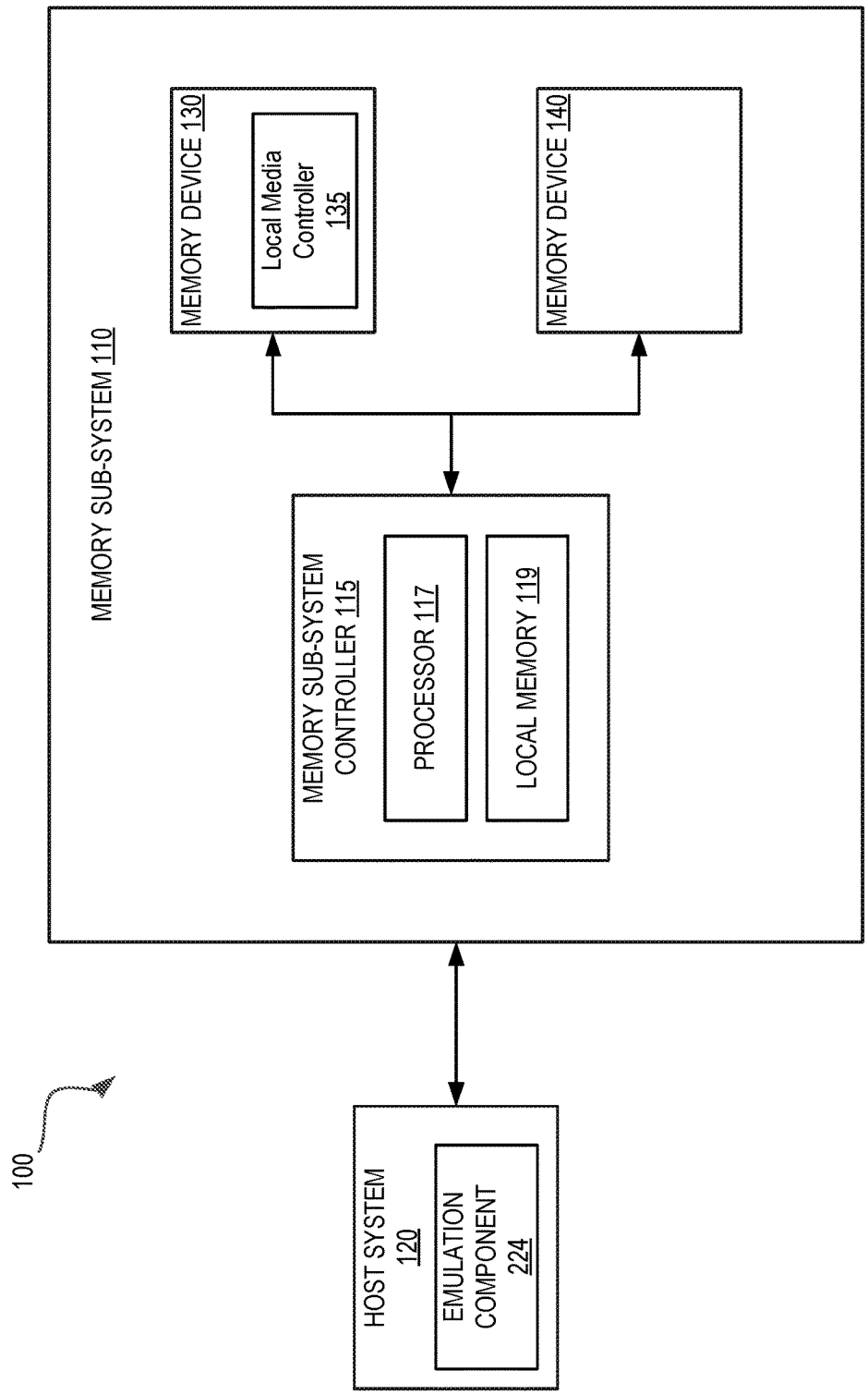
FIG. 1 illustrates an example computing system that includes a memory sub-system and a host system, in accordance with some embodiments of the present disclosure.

Aspects of the present disclosure are directed to emulating memory sub-systems that have different performance characteristics. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

The memory sub-systems are continuously evolving to incorporate changes that can both benefit and harm the performance of host systems. Even a small change to the performance of a memory sub-system can have adverse effects on the performance of a host system. For example, a negative change that increases the memory latency or decreases the memory bandwidth can have a disproportionate effect on the host system. The disproportionate effect can be an exponential decrease in the performance of the host system and can even cause the host system to fail (e.g., buffer overflows, race conditions, etc.). To detect and address the adverse the effects, the host systems are often tested with the changed memory sub-system. The changes can include hardware changes or software changes that can change any part of the memory sub-system, such as, the memory devices (e.g., DRAM memory cells), the memory controllers (e.g., memory sub-system controller, local media controller), the host controller interface, other portion of memory sub-system, or a combination thereof. Testing the changes to the memory sub-system can be challenging because the hardware or software can be delayed, expensive, defective, or otherwise unavailable.

Aspects of the present disclosure address the above and other deficiencies by providing technology that enables a host system to use its existing memory sub-system to emulate the characteristics of a target memory sub-system. The characteristics of the target memory sub-system (e.g., target characteristics) can include performance characteristics related to the latency or bandwidth of reading data, writing data, copying data, moving data, other data storage operation, or a combination thereof. The target memory sub-system can include features that adversely affect the performance characteristics (e.g., slower media, slower interface, slower interconnects, slower controller, additional overhead, etc.). The technology can determine the target characteristics and update the configuration of the host system so that the existing memory sub-system exhibits the performance characteristics that are the same or similar to the target characteristics. The updates can include introducing interconnect hops to the memory data path, decreasing the bus speed, partitioning the bandwidth, loading the memory controllers using memory intensive programs, other configuration change, or a combination thereof. Each of the configuration changes can alter the characteristics in different ways and the technology can evaluate the different changes and identify a configuration that can successfully emulate the performance of the target memory sub-system. The configured host system can then be tested to approximate how the host system would operate if it included the target memory sub-system.

Advantages of the technology disclosed herein include, but are not limited to, emulating memory sub-systems. The technology can use the emulation to provide a proof of concept or prototype of a host system that uses the target memory sub-system. In one example, the host system can include DRAM as main memory and can configure the host system so that the DRAM emulates the performance characteristics of another type of volatile memory, non-volatile memory (e.g., Persistent Memory (PMEM)), or other memory type. The host system with the emulated memory sub-system can be tested without using the actual target memory sub-system. This can enable testing before the target memory sub-system is available and can avoid or reduce the cost (e.g., time and money) associated with acquiring the target memory sub-system. This can also avoid the cost to install the target memory sub-system and reconfigure the host system, which can include other dependencies (e.g., hardware or software development costs). The testing of the host system can include performance testing (e.g., benchmarking), failure testing (e.g., functional testing), other testing, or a combination thereof. The technology can also enable end users to emulate different memory sub-systems to profile how hardware and software of the host system is affected by the performance of the memory sub-system.

FIG. 1 illustrates an example computing system 100 that includes a memory sub-system 110 and a host system 120 in accordance with some embodiments of the present disclosure. The memory sub-system 110 can include media, such as one or more non-volatile memory devices (e.g., memory device 130), one or more volatile memory devices (e.g., memory device 140), or a combination of such. Each memory device 130 or 140 can be one or more memory component(s).

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components or devices, which can be an indirect communicative connection or direct communicative connection (e.g., without intervening components or devices), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface, which can communicate over a system bus. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAIVI), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for memory management within the same memory device package. An example of a managed memory device is a managed NAND (MNAND) device.

The host system 120 can include an emulation component 224 that enables host system 120 to modify the configuration of host system 120 and one or more memory sub-systems 110 to emulate the use of a different memory sub-system. These and other features of emulation component 224 are discussed below.

Figure 2:
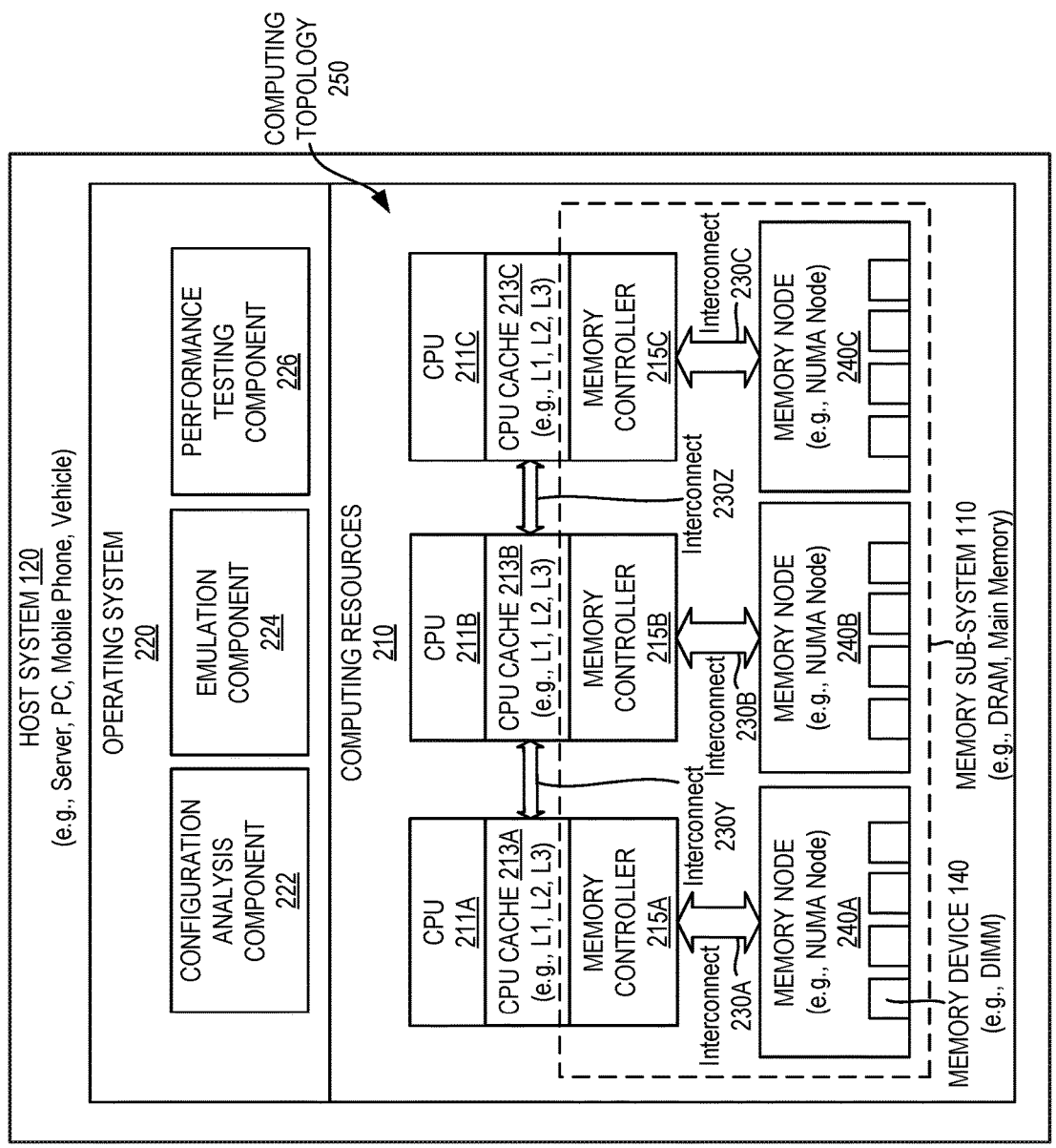
FIG. 2 is a detailed block diagram of the host system in accordance with some embodiments of the present disclosure.

FIG. 2 is a detailed block diagram of host system 120 that can use a memory sub-system 110 to emulate a memory sub-system that is absent from host system 120, in accordance to examples of the disclosure. Host system 120 can be the same or similar to host system 120 of FIG. 1 and can be referred to as a host machine, host device, or other term. Host system 120 can be or include one or more servers (e.g., on-premise server, cloud server, edge server), personal computers (e.g, laptop, desktop, workstation), mobile phones (e.g., smart phone), vehicles (e.g., autonomous vehicle(AV), electric vehicle (EV), aerial vehicle), Internet of Things (IoT) devices (e.g., smart speaker, kitchen appliance), industrial control systems (e.g., traffic light, gas meter), other devices, or a combination thereof. In the example illustrated in FIG. 2, host system 120 may include computing resources 210 and an operating system 220.

Computing resources 210 includes one or more CPUs 211A-C, memory controllers 215A-C, and memory nodes 240A-C that are arranged in a computing topology 250. Each of the CPUs 211A-C can be associated with memory sub-system 110, which can include a plurality of memory controllers 215A-C and a plurality of memory nodes 240A-C that are interconnected using interconnects 230A-Z. Each of CPUs 211A-C can have a local memory controller that controls access to one or more of the memory nodes 240A-C. The CPU can use the local memory controller to access a local memory node and can use a remote memory controller to access a remote memory node. In the example shown in FIG. 2, each of memory controllers 215A-C can be a part of the package or die of the respective CPUs 211A-C (e.g., integrated memory controllers). In other examples, memory controllers 215A-C can be separate from CPUs 211A-C (e.g., discrete memory controllers).

Interconnects 230A-Z can provide communication channels between computing resources 210. Interconnects 230A-C can be CPU-to-Memory interconnects that connect CPUs 211A-C to their respective local memory nodes 240A-C. Interconnects 230Y-Z can be CPU-to-CPU interconnects that connect CPUs 211A-C to one another. There can also or alternatively be interconnects between non-adjacent hardware resources (not shown), such as an interconnect between CPU 211A and CPU 211C or between a CPU and remote memory nodes 240B and 240C. Interconnects 230A-Z can include one or more interfaces, connectors, adapters, other piece of hardware or software, or a combination thereof. Interconnects 230A-Z can implement a standard or proprietary communication protocol that includes or is based on Compute Express Link™ (CXL), Peripheral Component Interconnect™ (e.g., PCI, PCIe), Non-Volatile Memory Express™ (NVMe), Advanced Host Controller Interface™ (AHCI), Serial Advanced Technology Attachment Interface™ (e.g., SATA, mSATA), Small Computer System Interface™ (SCSI, iSCSI), Integrated Drive Electronics™ (e.g., IDE, EIDE), InfiniBand™, other communication technology, or a combination thereof.

Memory nodes 240A-C can each include one or more memory devices 140. Memory device 140 can be made up of bits arranged in a two-dimensional grid of memory cells. Memory cells are etched onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline can constitute the address of the memory cell. A block can refer to a unit of the memory device 140 used to store data and can include a group of memory cells, a wordline group, a wordline, or individual memory cells. As discussed above, each memory device can be a memory module and include a dual in-line memory module (DIMM), a small outline DIMM (SO-DIMM), or various types of non-volatile dual in-line memory module (NVDIMM). In one example, memory nodes 240A-C can implement Non-Uniform Memory Access (NUMA) and be referred to as NUMA nodes.

NUMA is a computer memory design used in multiprocessing and the memory access time can depend on the memory location relative to the memory controller. Under NUMA, a CPU can access its own local memory faster than non-local memory. This can result in the CPU having a lower latency and higher bandwidth when accessing a local memory node and having a higher latency and lower bandwidth when accessing a remote memory node. This may occur because CPU 211A can use a single interconnect to access local memory node and can use multiple interconnects to access a remote memory nodes. For example, CPU 211A can access local memory node 240A using memory controller 215A and interconnect 230A that has a combined latency of 80 nanosecond (ns) and a bandwidth of 107 Gigabytes per second (GiB/s). CPU 211A can access remote memory node 240B using memory controller 215B and interconnects 230B and 230Y that has a combined latency of 130 ns (larger latency of 80 ns+50 ns) and a bandwidth of approximately 35 GiB/s (e.g., smaller bandwidth that is lesser of 35 and 107 GiB/s).

Computing topology 250 is the arrangement of computing resources 210 of host system 120. Computing topology 250 can define the arrangement of CPUs (e.g., CPU topology), memory nodes (e.g., Memory topology, NUMA topology), interconnects (e.g., interconnect topology, bus topology), or a combination thereof. In one example, computing topology 250 may be specific to hardware devices and be referred to as a hardware topology or hardware layout. Computing topology 250 can be based on the layout of sockets on one or more printed circuit boards.

A socket is a hardware interface that contains one or more mechanical components for providing mechanical and electrical connections between the printed circuit board (PCB) and one of the computing resources 210 (e.g., CPU). Each socket can receive the computing resource and communicably couple it with one or more other computing resources. A socket that receives a CPU is referred to as a CPU socket. Host system 120 can include more than one socket and can be referred to as a multi-socket host system (e.g., multi-socket server). For illustration purposes, host system 120 is a three socket server (CPU 211A-C) but in other examples it may be an N socket server, wherein N is any positive integer (e.g., 2, 4, 8, 16). The computing resources 210 in computing topology 250 can be managed by an operating system 220.

Operating system 220 may be any program or combination of programs that are capable of managing computing resources of host system 120. Operating system 220 may include a kernel comprising one or more kernel space programs (e.g., physical device driver, virtual device driver,) for interacting with virtual hardware devices or physical hardware devices. In one example, operating system 220 may include Linux™ (e.g., Fedora™, Ubuntu™), Unix (e.g., Solaris™), Microsoft Windows™, Apple Macintosh™, other operating system, or a combination thereof.

Operating system 220 can manage the execution of configuration analysis component 222, emulation component 224, and performance testing component 226. Configuration analysis component 222 can determine the configuration of the host system 120 and discover parameters that are available to change the configuration. Emulation component 224 can determine characteristics of a target memory sub-system that is absent from host system 120 and update the configuration to emulate the target memory sub-system. Emulation component 224 can evaluate multiple candidate configurations to in order to identify the configuration that most closely emulates the performance characteristics of the target memory sub-system. Performance testing component 226 can run one or more tests of host system 120 after it is configured to emulate the targeted memory sub-system. The tests may be benchmark tests, functional tests, real world workloads, other tests, or a combination thereof. Components 222, 224, and 226 are discussed in more detail below in regards to FIG. 4 can be implemented as one or more application programs, kernel programs (e.g., device drivers), other programs, or a combination thereof.

Figure 3:
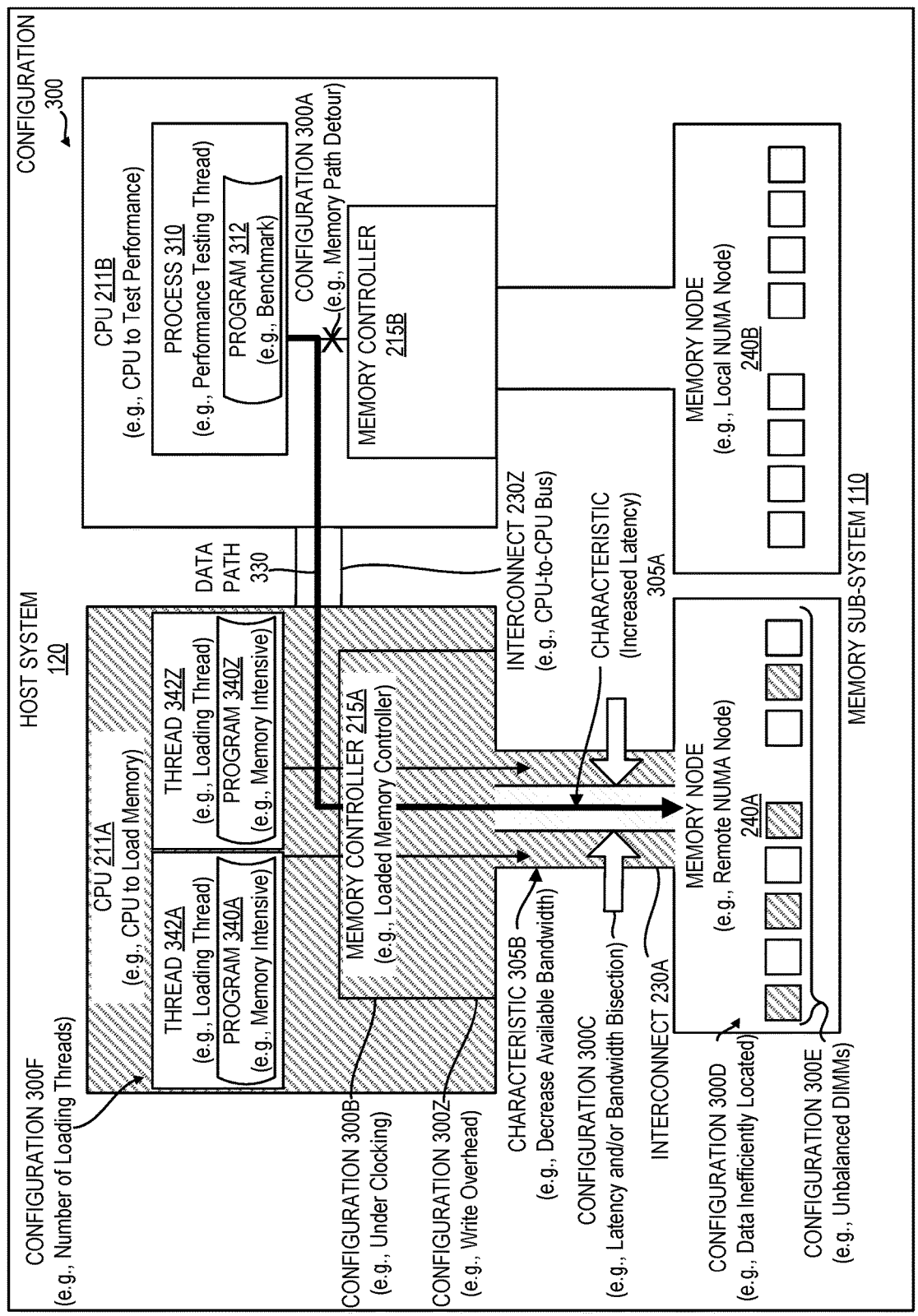
FIG. 3 is a diagram of the host system with optional configurations that change the performance characteristics of the memory sub-system, in accordance with some embodiments of the present disclosure.

FIG. 3 is a block diagram illustrating an example of how a configuration 300 of host system 120 can be updated to make the memory sub-system 110 emulate a target memory sub-system with different characteristics. In the example shown in FIG. 3, host system 120 can include multiple CPUs 211A-B and a first CPU 211A can provide a load that makes the memory sub-system emulate a target memory sub-system and the second CPU 211B can run a performance test using the emulated memory sub-system. In other examples, host system 120 can use multiple CPUs to provide the load and a different CPU to perform the test. In either example, host system 120 can be updated as illustrated by configurations 300A-Z to change the characteristics 305A-Z of memory sub-system 110.

Characteristics 305A-Z include one or more physical operating characteristics of memory sub-system 110 of host system 120. Characteristics 305A-Z can relate to how the memory sub-system operates on data, which can include transmitting data, processing data, storing data, accessing data, reading data, writing data, transforming data, formatting data, encoding/decoding data, encrypting/decrypting data, other operation, or a combination thereof. Characteristics 305A-Z can include one or more characteristics that represent the performance (e.g., performance characteristics), features (e.g., feature characteristics), or functions (e.g., functional characteristics) of the memory sub-system. Each of characteristics 305A-Z can relate to one or more measurements of time, quantity, capacity, speed, clock cycles, misses, faults, errors, failures, successes, other property, or combination thereof.

The measurements can correspond to particular data operations on a particular quantity of data. The data operations can include one or more load operations (e.g., reads), store operations (e.g., writes), copy operations (e.g., copy-on-writes), modify operations (e.g., read-modify-writes), other operation, or a combination thereof. The data operation can be initiated or submitted by a requestor and fulfilled or completed by a provider. The requestor can be the memory controller, CPU, processor core, interconnect, other computing resource, or a combination thereof. The provider can be one or more memory devices (e.g., memory cells), memory nodes, local media controllers, other computing resource, or a combination thereof. The quantity of data for the data operation can be based on one or more storage units and the storage units can be the same or similar to a bit, byte, word, block, cache line, stripe, frame, page, other storage unit or portion of a storage unit, or a combination thereof. The measurement can be represented as one or more values and each value can be a count, an average, a frequency, a minimum, a maximum, other value, or a combination thereof. In the example illustrated in FIG. 3, characteristic 305A can correspond to a latency and characteristic 305B can correspond to a bandwidth.

Latency can be based on an interval of time it takes the memory sub-system 110 to perform one or more data operations (e.g., memory latency). The latency can be a measurement of time (e.g., duration, period, or interval) that begins when the data operation is initiated and ends when the data operation is completed. For example, the latency of a read operation (e.g., access delay) can be an interval of time that begins when data is requested by the requestor and ends when some or all of the requested data is received from the provider. The latency of a store operation (e.g., store delay) can be the interval of time that begins when data is transmitted by the requestor and ends when either the data is stored in one or more media devices or when a response (e.g., acknowledgement) is received from the provider. In one example, the latency can be a Column Address Strobe latency (CL) and can be based on the delay in clock cycles between a read command and the instant the data becomes available. The interval measurement can be specified in clock cycles (e.g., clock ticks) or can be converted to a time duration (absolute time, wall clock time).

Bandwidth can be based on a rate that the memory sub-system 110 can perform one or more data operations (e.g., memory bandwidth). The bandwidth can be the same or similar to the throughput (e.g., user data and overhead), goodput (user data without overhead), other transfer rate, or a combination thereof. The overhead can include management data for error detection, error correction, recovery, acknowledgement, etc. The bandwidth can be expressed in units of data quantity per time duration (e.g., bytes per second) and can be an average bandwidth, sustained bandwidth, minimum bandwidth, maximum bandwidth, observed bandwidth, other bandwidth, or a combination thereof. In one example, measuring bandwidth can be done by counting the amount of data copied from one location in memory to another location per unit time. For example, copying 1 million bytes from one location in memory to another location in memory in one second would be counted as 1 million bytes per second (1 MB/sec).

Configuration 300 can be the system configuration of host system 120 and can be based on or include one or more hardware configurations, software configurations, or a combination thereof. The hardware configurations can include the configuration of one or more computing resources 210 and include the configuration of CPUs 211A-B, memory controllers 215A-B, memory nodes 240A-B, and interconnects 230A-Z, or a combination thereof. The software configurations can include the installation, execution, or configuration of one or more computer programs that include device firmware, device drivers, kernel, applications, other portion of operating system 220, or a combination thereof. In the example shown in FIG. 3, configuration 300 is a system configuration that includes one or more optional configurations 300A-Z.

Configurations 300A-Z can each correspond to a configuration parameter that can be changed to modify the characteristics of the memory subs-system. The configuration parameters and their alternate values (e.g., parameter values) are discussed in more detail in regards to parameter discovery module 412 of FIG. 4. Configurations 300A-Z are example configurations that can be used individually or in combination to cause the existing memory sub-system to have characteristics that emulate a target memory sub-system.

Configuration 300A can change the data path from using local memory to using remote memory and can be colloquially referred to as introducing a data path detour (e.g., memory detour). Configuration 300A can modify the data path and add one or more hops to the data path. Each extra hop can add an extra memory controller, interconnect, or a combination thereof. As shown in FIG. 3, process 310 can execute a benchmarking program 312 and would normally be associated with memory on local memory node 240B and configuration 300A can cause process 310 to be associated with memory on remote memory node 240A (e.g., allocated, designated, or assigned remote memory). The default data path for process 310 would have been from CPU 211B to memory controller 215B to interconnect 230B to memory node 240B. However configuration 300A, causes the data path to be from CPU 211B to interconnect 230Z to CPU 211A (e.g., CPU Cache to CPU Cache) to memory controller 215A to interconnect 230A to memory node 240A. This adds an extra interconnect to the data path, which increased the latency and decreased the bandwidth. Configuration 300A can be implemented by using an affinity parameter to cause process 310 to remain on CPU 211B and a pinning parameter to cause the process to use remote memory that is one or more hops away from CPU 211B (e.g., a remote NUMA node).

Configuration 300B can change the speed of one or more of the computing resources of host system 120. Changing the speed can involve increasing or decreasing the speed of one or more of the memory controllers, interconnects, CPUs, memory nodes, memory devices, or a combination thereof. In one example, configuration 300B can decrease the speed of memory controller 215A. In another example, configuration 300B can decrease the speed of interconnect 230A, interconnect 230Z, or a combination thereof. In either example, this may involve overclocking or underclocking the computing resources by modifying one or more parameters related to clock rates, clock multipliers, other feature, or a combination thereof.

The clock rate can be the frequency at which the clock generator can generate pulses that are used to synchronize the data operations of computing resources. The clock rate can be provided by a mother board, CPU, memory controller, memory node, memory device, other computing resource, or a combination thereof. The clock rate can be an indicator of the speed or frequency of the computing resource and therefor clock rate, clock speed, and clock frequency can be used interchangeably. The clock rate can be measured in clock cycles per second (cycles/sec) or the unit hertz (Hz).

The clock multiplier can be the ratio of an internal clock rate to an externally supplied clock rate. There can be a clock multiplier for CPUs (e.g., CPU multipliers), interconnects (e.g., bus multipliers), memory controllers (e.g., controller multipliers), other device, or a combination thereof. The clock multiplier can modify the interconnect to processor ratio (e.g, bus/core ratio). For example, CPUs 211A and 211B can have a 36× clock multiplier and for every external clock cycle (e.g., 100 MHz) there can be 36 internal cycles (e.g., 3.6 GHz).

Configuration 300C can involve partitioning the bandwidth into multiple partitions. This decreases the portion of bandwidth available along data path 330 to a fraction of the original bandwidth (e.g., ½, ⅓, ¼, etc.). The multiple partitions can each have the same portion of bandwidth (e.g., ½, ½) or have different portions of bandwidth (½, ¼, ¼). In one example, configuration 300C can change parameters that cause bandwidth bisection and results in the bandwidth being split into two partitions, but other numbers of partitions are also possible and would further decrease the available bandwidth for data path 330. In the example shown in FIG. 3, the bandwidth of interconnect 230A can be partitioned into two portions and a portion can be used by process 310 that is testing the emulated memory sub-system and the remaining portions can be used by one or more other processes.

Configurations 300D and 300E can involve making the memory nodes less efficient with loading and storing data. Configuration 300D can involve spreading the data within the memory node so that the data is less efficiently accessed. This can be done before, during, or after writing or reading the data and involve storing the data across different memory cells, stripes, planes, zones, dies, or memory devices. Configuration 300E can involve making a physical change to the memory node so that it has an unbalanced memory configuration. This can involve populating memory devices (DIMMs) to reduce the efficiency of memory interleaving, which results in increasing latency. This can also or alternatively involve having memory devices (e.g., DIMMs) at different speeds, different capacities, or missing a corresponding match (e.g., missing a matching 8 GB DIMM). As shown in FIG. 2, memory node 240A can include a 5 GB DIMM and a 3 GB DIMM instead of a pair of 4 GB DIMMs.

Configuration 300F can involve using a CPU to generate a computing workload that approximately loads the memory sub-system 110. The load can be a workload that predictably and consistently loads memory controller 215A, interconnect 230A, memory node 240A, other portion of memory sub-system 110, or a combination thereof. The load can be generated using programs 340A-Z and one or more threads 342A-Z.

Programs 340A-Z can be designed to generate a workload that is memory intensive and precisely affects the characteristics 305A-Z (e.g., increase latency, decrease available bandwidth). Programs 340A-Z can generate a sequence of memory operations and use an arrangement of binary data that increase or maximizes the consumption of memory sub-system 110. Programs 340A-Z can be memory intensive and include code (e.g., executable data), information (non-executable data), or a combination thereof. The code can include one or more function calls (e.g., API calls, system calls, hypercalls), commands (e.g., Command Line Interface (CLI) commands), instructions (e.g., CPU instructions), other operation, or a combination thereof. In one example, programs 340A-Z can include third party utilities (e.g., LikWid), OS utilities (e.g., Linux memhog), CPU manufacturer utilities (e.g., Intel Memory Latency Checker (MLC) load generator functions), other programs, or a combination thereof.

Thread 342A-Z can be computing threads that are used to execute programs 340A-Z. Threads 342A-Z can each execute an instance of a computer program and programs 340A-Z may be instances of the same computer program or instances of different computer programs. Each of the threads 342A-Z can have a limit to the amount of load it can generate and the more threads the larger the total load. Configuration 300F can include selecting the number of threads to precisely control the size of the load on memory sub-system 110. Threads 342A-Z can execute in parallel (e.g., concurrently) and can be sibling threads that are all part of the same computing process or can be threads of one or more different computing processes. In the example of FIG. 3, threads 342A-Z can execute on CPU 211A and apply the load to the local memory node 240A and local memory controller 215A. In other examples, threads 342A-Z can execute on another CPU or on multiple CPUs and apply the load to the same memory node 240A and memory controller 215A or to multiple memory nodes and memory controllers.

Configuration 300Z can involve introducing additional overhead on read operations, write operations, or a combination thereof. This can be done so that the performance characteristics between read and write are more or less symmetric (e.g., increase or decrease the read-to-write ratio). For example, overhead can be added to the write operations to make them slower without changing the speed of the read operations.

Figure 4:
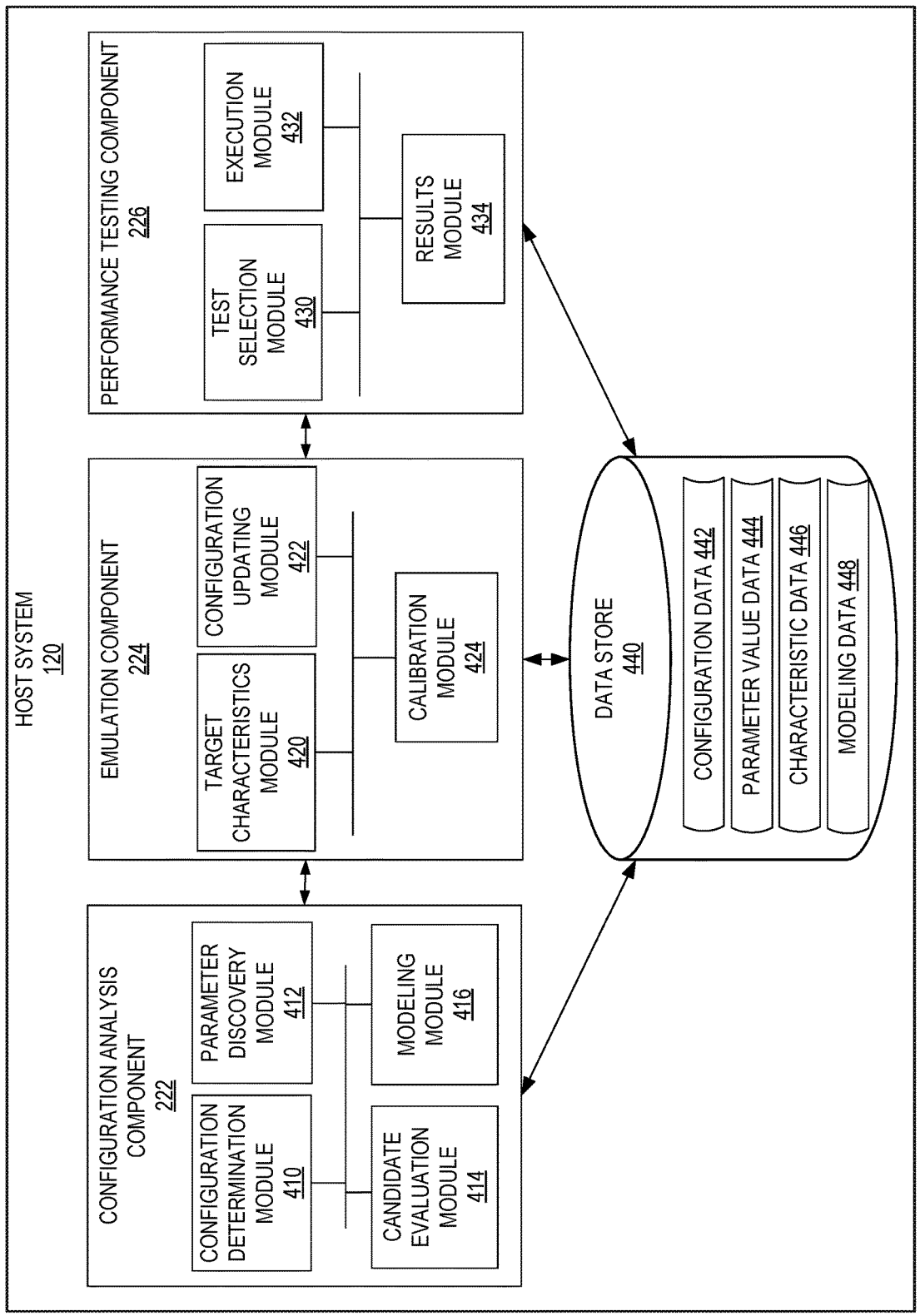
FIG. 4 is a detailed block diagram of a host system that illustrates example components and modules, in accordance with some embodiments of the present disclosure.

FIG. 4 is a block diagram illustrating an exemplary host system 120 that that can update its configuration to emulate a memory sub-system that is absent from host system 120. The features discussed in regards to the components and modules of FIG. 5 can be implemented in software (e.g., program code) or hardware (e.g., circuitry) of host system 120. More or less components or modules can be included without loss of generality. For example, two or more of the components can be combined into a single component, or features of a component can be divided into two or more components. In the example illustrated, host system 120 can include a configuration analysis component 222, an emulation component 224, and a performance testing component 226.

Configuration analysis component 222 can be used to determine the configuration of host system 120 and to discover parameters that are available to modify the configuration. In one example, configuration analysis component 222 can include a configuration determination module 410, a parameter discovery module 412, a candidate evaluation module 414, and a modeling module 416.

Configuration determination module 410 can enable host system 120 to determine the configuration of host system 120. As discussed above, the configuration can be a system configuration that includes software configurations and/or hardware configurations of one or more of the computing resources. Determining the configuration of host system 120 can involve accessing data about the configuration of host system 120 from the operating system, computing resources, or a combination thereof and storing it as configuration data 442 in data store 440. The operating system is responsible for managing computing resources and often stores configuration data in one or more storage objects, such as files (e.g., configuration files, settings files), registries (e.g., hives), databases (e.g., configuration records), other storage object, or a combination thereof. Configuration determination module 410 can access configuration data from the operating system (OS) by making one or more requests (e.g., system calls) and receiving responses with the configuration data. Configuration determination module 410 can also or alternatively request configuration data directly from the computing resources by transmitting requests to the computing resource (e.g., CPU, memory controller) and receiving a response with the configuration data.

Configuration data 442 can include data that represents information about the computing resources 210, computing topology 250, configuration 300, and optional configurations 300A-Z discussed above in regards to FIGS. 2-3. The configuration data received from the operating system or computing resources can be transformed, aggregated, filtered, supplemented, before during or after being stored in data store 440 as configuration data 442. The stored configuration data 442 can include information about the quantity, location, types, versions, identifiers, or other information for the hardware and software of some or all of the computing resources of host system 120. In one example, configuration data 442 can indicate that host system 120 is a multi-socket server with a particular number of CPUs and memory nodes. The configuration data can also indicate the relative locations (e.g., hop count) of the CPUs and memory nodes and indicate the memory nodes that are local and remote from each CPU.

Parameter discovery module 412 can enable host system 120 to analyze configuration data 442 to identify parameters that are available to update configuration 300. Parameter discovery module 412 can be aware of a global set of parameters and can analyze the configuration data to detect which parameters in the global parameter set are available on host system 120. In one example, parameter discover module 412 can determine available parameter values corresponding to: bus speed options (e.g., 133 MHz, 266 MHz), number of parallel threads per CPU (e.g., 4, 8, 56 concurrent threads), options for thread affinity (e.g., thread 1 bound to core 1), pinning memory of a thread (e.g., remote or local), options to detour the data path (e.g., 0, 1, or 3 hops). Each of the available parameters can correspond to one or more alternate parameter values. The resulting set of available parameters and their corresponding set of available parameter values (e.g., parameter value data 444) can define a configuration parameter space for host system 120.

The configuration parameter space can represent different options for configuring host system 120. The configuration parameter space can be an n-dimensional space where each dimension corresponds to a parameter in the set of available parameters and the locations along the dimension correspond to the alternate parameter values for that parameter. For example, the set of available parameter values can include a first parameter with two options (e.g., data path with zero hops or one hop) and a second parameter with three options (e.g., bus speed of underclocked, normal, or overclocked), and a third parameter with nine options (e.g., 0-8 loading threads). In this simplified example, the set of available parameters is 3 and the set of available parameter values is 14 (2+3+9).

Candidate evaluation module 414 can enable host system 120 to select and evaluate one or more candidate configurations for host system 120. Each of the candidate configurations can be a particular combination of parameter values and can correspond to a single point in the configuration parameter space. The configuration parameter space can have n-dimensions and therefore each point in the configuration parameter space can correspond to n coordinate values (e.g., a value along the first dimension, second dimension, and third dimension). The combination of coordinate values that identify the point map to the combination of available parameter values that make up a single candidate configuration. In the simplified example discussed above, the configuration parameter space is based on the set of 3 available parameters that have a total of 14 available parameter values. This results in 54 potential combinations (e.g., 2*3*9) and each of the potential combinations can be a potential configuration of host system 120.

Candidate evaluation module 414 can explore the configuration parameter space by selecting which of the potential configurations should be a candidate configuration that gets evaluated. In one example, candidate evaluation module 414 can select every potential combinations as a candidate configuration. In another example, candidate evaluation module 414 can select a subset of the potential combinations as candidate configurations. In yet another example, candidate evaluation could start with a candidate set, and stop when a sufficiently good candidate set was found. In any example, candidate evaluation module 414 can evaluate each of the selected candidate configurations by measuring the characteristics of the memory sub-system while the host system 120 is using the candidate configuration. The measurement can take place during normal use of host system 120 or candidate evaluation module 414 can run an evaluation workload that includes a particular program and data set that is used to evaluate the candidate configuration. The evaluating can be the same or similar to experimenting, testing, executing, running, other term, or a combination thereof. Candidate evaluation module 414 can use one or more programs to test and measure the characteristics of the candidate configuration. The programs can be the same or similar to tools, utilities, or features and include CPU manufacturer utilities (e.g., Intel Memory Latency Checker (MLC), Intel Processor Counter Monitor (PCM)), third party tools (e.g., Likwid, likwid-bench, sysinternals, ProcMon,), OS utilities (e.g., Task Manager), other programs, or a combination thereof.

Before, during, or after evaluating the candidate configurations, candidate evaluation module 414 can store the resulting characteristics of each candidate configuration. The resulting characteristics (e.g., latency, bandwidth, etc) can be stored in data store 440 and can also or alternatively be used to update the parameter space (e.g., adding results to the points).

Modeling module 416 can enable host system 120 to evaluate characteristic data 446 and generate a model to represent the effects of configuration updates on the characteristics of the memory sub-system 110. In one example, the model can be a mathematical model that represents the characteristics of the memory sub-system as a function of the available parameter values. In another example, the model can be a data structure that maps characteristics of the memory sub-system to the corresponding parameter values or candidate configurations. In either example, modeling module 416 can model all of the evaluated candidate combinations which can include all of the potential combinations in the parameter space or a subset of the potential combinations (e.g., modeling data 448). The results of the modeling can be displayed to the user to enable the user to determine the range of characteristics that can achieve by re-configuring host system 120.

In one example, host system 120 can avoid a combinatorial explosion by evaluating an initial set of the potential combination before determining the target characteristics and a subsequent set of potential combination after determining the target characteristics, as discussed below in regards to calibration module 424. The initial set can be simple candidate configurations that include a change to a single parameter or a small subset of the parameters. For example, a first candidate configuration includes a change to a first parameter and a second candidate configuration includes a change to a second parameter and both candidate configuration are absent changes to any of the other parameters. All of the candidate configuration can be defined by the parameter values that are different from another configuration and therefore a candidate configuration can be represented by a single parameter value. The other configuration can be a base configuration, a default configuration, a prior configuration, a current configuration, a future configuration, or a combination thereof. This is advantageous because a particular configuration of host system 120 can correspond to hundreds or thousands of different parameter values.

Emulation component 224 can determine characteristics of a target memory sub-system that is absent from host system 120 and update the configuration of the host system 120 to emulate the target memory sub-system. Emulation component 224 can evaluate multiple candidate configurations in order to identify the configuration that most closely emulates the performance characteristics of the target memory sub-system. In one example, emulation component 224 can include a target characteristics module 420, a configuration updating module 422, and a calibration module 424.

Target characteristics module 420 can determine the target characteristics that the memory sub-system of the host system will emulate. The target characteristics module 420 can receive a request from a user to emulate a characteristic of a target memory sub-system. The request can include user input or can initiate a prompt by the host system to receive user input. The target characteristics can be determined based on the user input. In one example, the user can provide input that identifies a target memory sub-system and target characteristics module 420 can look up the target characteristics for the target memory sub-system. The look up can be a local look up using a table with specifications of different memory sub-systems or can be a remote look up that uses a service available over the internet. In another example, the user can provide the target characteristics by selecting them from in interface or typing them into an interface. The interface can be based on a Graphical User Interface (GUI), a Command Line Interface (CLI), a Web Interface, an Application Programming Interface (API), other interface, or a combination thereof. In one example, the memory sub-system of the host system can include Dynamic Random Access Memory (DRAM) and the target memory sub-system can include Non-Volatile Memory (NVRAM) that is absent from the host system. The target characteristics of the target memory sub-system can include the read latency (e.g., X nanosecond), a write latency (e.g., Y nanosecond), a transfer bandwidth (e.g., Z GiB/s), other characteristic, or a combination thereof.

Configuration updating module 422 can update the configuration of host system 120 based on the plurality of candidate configurations. The updated configuration can change the memory sub-system to emulate the characteristic of the target memory sub-system. In one example, updating the configuration based on the plurality of candidate configuration can involve selecting one of the candidate configurations. In another example, updating the configuration based on the plurality of candidate configurations can involve identifying a new configuration that is different from the candidate configurations, as discussed below in regards to calibration module. In either example, configuration updating module 422 can update the configuration of host system 120 by starting one or more threads on a CPU associated with a local memory node of the memory sub-system. The one or more threads can each comprise a memory intensive program. Configuration updating module 422 can cause memory allocated to the multiple threads to be located on a remote memory node of the memory sub-system and not on the local memory node (e.g., extend the data path one hop to remote memory). Configuration updating module 422 can reduce a bus speed of a remote memory controller that provides the CPU access to the remote memory node and activate processor affinity to cause the one or more threads to stay on the CPU and continue to using the extended data path.

Calibration module 424 can enable host system 120 to measure the characteristics of the current configuration and to adjust the current configuration to more closely align with the target characteristics. Calibration module 424 can perform adjustments after determining the target characteristic and be the same or similar to candidate evaluation module 414, which can perform evaluations of the candidate configurations in the absence of the target characteristics (e.g., before determining the target characteristic or without checking it). Calibration module 424 can execute as a single iteration or as multiple iterations that may or may not use feedback from a prior iteration. Each iteration can identify a new configuration and use one or more of the modules discussed above to update the existing configuration and evaluate the new configuration.

In one example, updating the configuration based on the plurality of candidate configurations can involve selecting a configuration that is based on the resulting characteristics of the plurality of candidate configuration but is different from the candidate configurations. For example, two of the candidate configurations can be close to the target characteristic but one can be slightly higher and the other slightly lower. Configuration updating module 422 can identify a new configuration based on the two candidate configurations (e.g., a new configuration between the two) and update the host based on the identified new configuration. In either example, configuration updating module 422 can configure host system 120 so that the characteristics of the memory sub-system are substantially similar (e.g., plus or minus 10%) to the target characteristics.

Performance testing component 226 can run one or more tests on the host system after host system 120 is configured to emulate the targeted memory sub-system. In one example, performance testing component 226 can include a test selection module 430, an execution module 432, and results module 434.

Test selection module 430 can select the one or more tests to run on the host system 120. The test can include one or more benchmark tests, performance tests, use case tests, system tests, functional tests, regression tests, other tests, or a combination thereof. The test can be selected based on user input, computing resources, other aspect of host system 120, or a combination thereof. The test can include executable data (e.g., code, programs), non-executable data (e.g., workload, settings), other data or a combination thereof. The tests can include one or more tests that are sensitive to memory bandwidth, memory latency, other characteristic, or a combination thereof. A test that is sensitive to memory bandwidth can be a stream test (e.g., STREAM Benchmark). The stream test can involve data streaming using sequential memory copy operations that consume all of the available bandwidth of the emulated memory sub-system. The stream test can use cache read-ahead to make the test less sensitivity to memory latency. A test that is sensitive to memory latency can be a graph test (e.g., Graph500 Benchmark). The graph test can involve traversing a graph data structure and can involve many dependent loads (e.g., pointer chasing) that make it more sensitive to memory latency and less sensitive to memory bandwidth.

Test execution module 432 can enable host system 120 to run the one or more tests of the host system after updating the configuration to emulate the characteristic of the target memory sub-system. As discussed above, one or more of the CPUs of host system 120 can be loading CPUs that are running loading threads to generate a precision workload to emulate the target characteristics. Test execution module 432 can run the test using different CPUs (e.g., a testing CPU) or on different cores of the loaded CPU (e.g., testing cores). In either example, the updated configuration applies a load on the memory sub-system using a first CPU core and the performance test applies an additional load on the memory sub-system using a second CPU core (e.g., same or different CPU).

Results module 434 can enable host system 120 to determine the results of the one or more tests. The tests can include techniques to measure the performance of the test before, during, or after it runs. The test results can then be stored, transmitted, displayed, other action, or a combination thereof.

FIG. 5 is a flow chart of a method 500 for updating the configuration of the host system to emulate the performance characteristics of a target memory sub-system, in accordance with some embodiments of the present disclosure. Method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by host system 120 of FIG. 1-4. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic can determine a configuration of a host system that includes a memory sub-system. In one example, the host system is a multi-socket server with a multiple CPUs and the memory sub-system includes multiple memory nodes. Each of the CPUs can use a local memory controller to access a local memory node and can use a remote memory controller to access a remote memory node.

At operation 520, the processing logic can receive a request to emulate a characteristic of a target memory sub-system. The characteristic of the target memory sub-system can be a set of performance characteristics that includes at least one of a read latency (e.g., 200 ns), a write latency (e.g., 400 ns), and a transfer bandwidth (e.g., 35 GiB/S). The individual performance characteristics of the target memory sub-system can be worse, better, or equal to the corresponding performance characteristics of the memory sub-system of the host system. In one example, memory sub-system of the host system comprises Dynamic Random Access Memory (DRAM) and the target memory sub-system comprises Non-Volatile Memory (NVRAM) that is absent from the host system.

At operation 530, the processing logic can analyze a plurality of candidate configurations for the host system. The plurality of candidate configurations can include one or more candidate configurations that generate a load on the memory sub-system to make the memory sub-system emulate the target memory sub-system (e.g., mimic, simulate, or emulate one or more of the target characteristics). Each of the plurality of candidate configurations corresponds to a point in a configuration parameter space and includes a combination of parameter values. The configuration parameter space represents alternate parameter values of a set of one or more parameters available on the host system.

The processing logic can determine the plurality of candidate configurations based on available parameter values of the host system. The determination can involve determining available parameter values corresponding to bus speeds for the memory sub-system, determining available parameter values corresponding to a number of parallel threads that can be executed by a CPU of the host system, determining available parameter values corresponding to an affinity of a thread to a core of the CPU, and/or determining available parameter values corresponding to pinning memory of a thread to a remote memory node.

The processing logic can analyze the plurality of candidate configurations by exploring the parameter space of the host system. The exploring can involve selecting a candidate configuration based on a set of available parameter values, updating the configuration of the host system based on the candidate configuration, and storing characteristic data of the candidate configuration. The characteristic data can indicate one or more characteristics of the memory sub-system while using the candidate configuration. The processing logic can evaluate the characteristic data and generate one or more mathematical models that represent the characteristics of the memory sub-system as a function of the available parameter values.

At operation 540, the processing logic can update the configuration of the host system based on the plurality of candidate configurations. The updated configuration can change the memory sub-system to emulate the characteristic of the target memory sub-system. In one example, updating the configuration of the host system can involve starting a plurality of threads on a CPU associated with a local memory node of the memory sub-system. The plurality of threads can include a memory intensive program. The processing logic can allocate memory for the plurality of threads on a remote memory node of the memory sub-system and reduce a bus speed of a remote memory controller that provides the CPU access to the remote memory node. The processing logic can activate processor affinity to cause the plurality of threads to stay on the CPU.

In alternate example of method 500, the processing logic can run a performance test of the host system after updating the configuration to emulate the characteristic of the target memory sub-system. The updated configuration can apply a load on the memory sub-system using a first CPU and the performance test can apply an additional load on the memory sub-system using a second CPU. The results of the performance test can indicate the effects the target memory sub-system would have on the host system.

Figure 6:
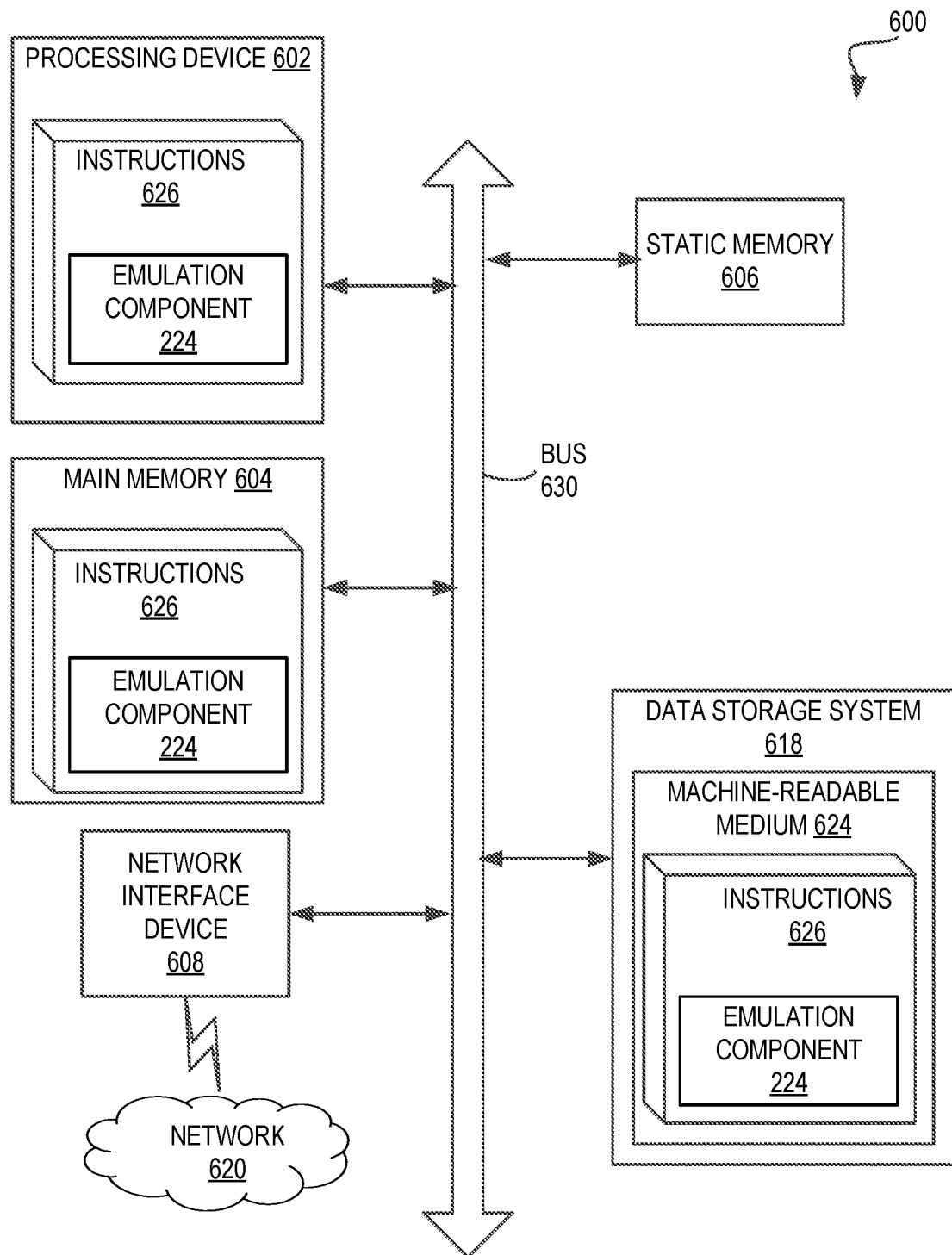
FIG. 6 is a block diagram of an example computer system in which embodiments of the present disclosure can operate.

FIG. 6 illustrates an example machine of a computer system 600 within which a set of instructions, for causing the machine to perform any one or more of the methodologies discussed herein, can be executed. In some embodiments, the computer system 600 can correspond to a memory controller (e.g., the memory controller 215A-Z of FIGS. 2-3) that includes, is coupled to, or utilizes a memory sub-system (e.g., memory sub-system 110 of FIG. 1-3). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a non-transitory computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to the emulation component 224 of FIGS. 1-2 and 4. While the machine-readable storage medium 624 is shown in an example embodiment to be a single medium, the term "non-transitory machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., non-transitory computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
    receiving, by a processing device, a request to emulate a characteristic of a target memory sub-system;
    identifying a candidate configuration that generates a load on a memory sub-system of a host system to decrease a characteristics of the memory sub-system of the host system; and
    updating a configuration of the host system based at least on the candidate configuration, wherein the updated configuration changes the memory sub-system of the host system to emulate the characteristic of the target memory sub-system.

2. The method of claim 1, wherein the memory sub-system of the host system comprises Dynamic Random Access Memory (DRAM) and wherein the target memory sub-system comprises Non-Volatile Memory (NVRAM) that is absent from the host system.

3. The method of claim 1, wherein the characteristic of the target memory sub-system comprises a set of performance characteristics comprising at least one of a read latency, a write latency, or a transfer bandwidth.

4. The method of claim 1, wherein the host system comprises a multi-socket server with a plurality of CPUs and wherein the memory sub-system comprises a plurality of memory nodes, wherein each of the plurality of CPUs uses a local memory controller to access a local memory node and uses a remote memory controller to access a remote memory node.

5. The method of claim 1, wherein updating the configuration of the host system comprises:
    starting a plurality of threads on a CPU associated with a local memory node of the memory sub-system, wherein the plurality of threads comprise a memory intensive program;
    allocating memory for the plurality of threads on a remote memory node of the memory sub-system;
    reducing a bus speed of a remote memory controller that provides the CPU access to the remote memory node; and
    activating processor affinity to cause the plurality of threads to stay on the CPU.

6. The method of claim 1, further comprising:
    running a performance test of the host system after updating the configuration to emulate the characteristic of the target memory sub-system, wherein the updated configuration applies a load on the memory sub-system using a first CPU and wherein the performance test applies an additional load on the memory sub-system using a second CPU.

7. The method of claim 1, wherein the candidate configuration corresponds to a point in a configuration parameter space and comprises a particular combination of parameter values, wherein the configuration parameter space represents available parameter values of the host system.

8. The method of claim 1, further comprising determining a plurality of candidate configurations based on available parameter values of the host system, wherein the determining comprises:
    determining available parameter values corresponding to different bus speeds for the memory sub-system;
    determining available parameter values corresponding to a number of parallel threads that can be executed by a CPU of the host system;
    determining available parameter values corresponding to an affinity of a thread to a core of the CPU;
    determining available parameter values corresponding to a number of hops in a data path to a remote memory node; and
    determining available parameter values corresponding to pinning memory of a thread to the remote memory node.

9. The method of claim 1, further comprising exploring a configuration parameter space of the host system, wherein the exploring comprises:
    selecting the candidate configuration based on a set of available parameter values;
    updating the configuration of the host system to apply the candidate configuration;
    evaluating the candidate configuration by measuring one or more characteristics of the memory sub-system; and
    storing characteristic data that represents the one or more characteristics.

10. The method of claim 9, further comprising:
    generating, based on the characteristic data, one or more mathematical models that represent the characteristics of the memory sub-system as a function of the available parameter values of the host system.

11. A host system comprising:
    a memory sub-system; and
    a processor, operatively coupled with the memory sub-system, to perform operations comprising:
        receiving a request to emulate a characteristic of a target memory sub-system;
        identifying a candidate configuration that generates a load on a memory sub-system of a host system to decrease a characteristics of the memory sub-system of the host system; and
        updating a configuration of the host system based at least on the candidate configuration, wherein the updated configuration changes the memory sub-system of the host system to emulate the characteristic of the target memory sub-system.

12. The host system of claim 11, wherein the memory sub-system of the host system comprises Dynamic Random Access Memory (DRAM) and wherein the target memory sub-system comprises Non-Volatile Memory (NVRAM) that is absent from the host system.

13. The host system of claim 11, wherein the characteristic of the target memory sub-system comprises a set of performance characteristics comprising at least one of a read latency, a write latency, or a transfer bandwidth.

14. The host system of claim 11, wherein the host system comprises a multi-socket server with a plurality of CPUs and wherein the memory sub-system comprises a plurality of memory nodes, wherein each of the plurality of CPUs uses a local memory controller to access a local memory node and uses a remote memory controller to access a remote memory node.

15. The host system of claim 11, wherein the candidate configuration corresponds to a point in a configuration parameter space and comprises a particular combination of parameter values, wherein the configuration parameter space represents available parameter values of the host system.

16. A non-transitory computer-readable medium storing instructions, which when executed by a processing device, cause the processing device to perform operations comprising:

receiving a request to emulate a characteristic of a target memory sub-system;

identifying a candidate configuration that generates a load on a memory sub-system of a host system to decrease a characteristics of the memory sub-system of the host system; and updating a configuration of the host system based at least on the candidate configuration, wherein the updated configuration changes the memory sub-system of the host system to emulate the characteristic of the target memory sub-system.

17. The non-transitory computer-readable medium of claim 16, wherein the memory sub-system of the host system comprises Dynamic Random Access Memory (DRAM) and wherein the target memory sub-system comprises Non-Volatile Memory (NVRAM) that is absent from the host system.

18. The non-transitory computer-readable medium of claim 16, wherein the characteristic of the target memory sub-system comprises a set of performance characteristics comprising at least one of a read latency, a write latency, and a transfer bandwidth.

19. The non-transitory computer-readable medium of claim 16, wherein the host system comprises a multi-socket server with a plurality of CPUs and wherein the memory sub-system comprises a plurality of memory nodes, wherein each of the plurality of CPUs uses a local memory controller to access a local memory node and uses a remote memory controller to access a remote memory node.

20. The non-transitory computer-readable medium of claim 16, the operations further comprising:

running a performance test of the host system after updating the configuration to emulate the characteristic of the target memory sub-system, wherein the updated configuration applies a load on the memory sub-system using a first CPU and wherein the performance test applies an additional load on the memory sub-system using a second CPU.

* * * * *